(12) United States Patent
Lad et al.

(10) Patent No.: US 10,157,107 B2
(45) Date of Patent: Dec. 18, 2018

(54) DATA BACKUP AND PROGRESSIVE RESTORATION USING DATA CHUNKS IN CLOUD STORAGE AND A DATA CACHE

(71) Applicant: Catalogic Software, Inc., Woodcliff Lake, NJ (US)

(72) Inventors: Kamlesh Lad, Woodcliff Lake, NJ (US); Peter Chi-Hsiung Liu, Paramus, NJ (US)

(73) Assignee: CATALOGIC SOFTWARE, INC., Woodcliff Lake, NJ (US)

( * ) Notice: Subject to any disclaimer, the term of this patent is extended or adjusted under 35 U.S.C. 154(b) by 0 days.

(21) Appl. No.: 14/322,311

(22) Filed: Jul. 2, 2014

(65) Prior Publication Data

US 2015/0012709 A1    Jan. 8, 2015

Related U.S. Application Data

(60) Provisional application No. 61/842,563, filed on Jul. 3, 2013.

(51) Int. Cl.

| | |
|---|---|
| *G06F 11/08* | (2006.01) |
| *G06F 11/14* | (2006.01) |
| *G06F 12/08* | (2016.01) |
| *G06F 12/16* | (2006.01) |
| *G06F 12/0868* | (2016.01) |

(52) U.S. Cl.
CPC ...... *G06F 11/1469* (2013.01); *G06F 11/1453* (2013.01); *G06F 11/1464* (2013.01); *G06F 11/1466* (2013.01); *G06F 12/0868* (2013.01); *G06F 2201/815* (2013.01)

(58) Field of Classification Search
CPC ............ G06F 11/1464; G06F 11/1461; G06F 11/1458; G06F 12/0868; G06F 14/1469; G06F 14/1466; G06F 14/1453; G06F 2201/815
See application file for complete search history.

(56) References Cited

U.S. PATENT DOCUMENTS

| | | | |
|---|---|---|---|
| 7,937,547 B2 * | 5/2011 | Liu ........................ | G06F 3/0482 711/162 |
| 8,346,726 B2 * | 1/2013 | Liu ........................ | G06F 3/0482 707/640 |
| 8,370,305 B2 * | 2/2013 | Petrocelli .............. | G06F 3/0608 707/640 |

(Continued)

*Primary Examiner* — Glenn Gossage
(74) *Attorney, Agent, or Firm* — Foley Hoag LLP

(57) ABSTRACT

A system for progressive just-in-time restoration of data from backup media. Backup data may be divided into a plurality of chunks and stored on any kind of media such as a direct attached storage (DAS) disk, object storage, USB drive, network share or tape. An index map is maintained that indicates the location of each of the plurality of chunks in cloud storage, the index map representing contiguous blocks of backup data of a volume. The backup data may be compressed, encrypted, or de-duplicated. The backup data may be located on different media, object stores, or network shares, or at differing geographic locations. To perform a recovery, a virtual LUN or virtual volume is mounted and provided to the operating system and applications of the restored computer. Chunks may be progressively copied from cloud storage to a data cache and restored in response to requests for blocks.

9 Claims, 3 Drawing Sheets

(56) References Cited

U.S. PATENT DOCUMENTS

| | | | |
|---|---|---|---|
| 9,715,502 B1* | 7/2017 | Manukonda | G06F 17/30079 |
| 2009/0083563 A1* | 3/2009 | Murase | G06F 1/3268 |
| | | | 713/324 |
| 2010/0070474 A1* | 3/2010 | Lad | G06F 3/0605 |
| | | | 707/624 |
| 2010/0094817 A1* | 4/2010 | Ben-Shaul | G06F 3/0608 |
| | | | 707/697 |
| 2010/0257142 A1 | 10/2010 | Murphy et al. | |
| 2011/0167221 A1* | 7/2011 | Pangal | G06F 11/1453 |
| | | | 711/117 |
| 2013/0024424 A1 | 1/2013 | Prahlad et al. | |
| 2017/0206145 A1* | 7/2017 | Panchanathan | G06F 11/1464 |

* cited by examiner

DATA BACKUP AND PROGRESSIVE RESTORATION USING DATA CHUNKS IN CLOUD STORAGE AND A DATA CACHE

CROSS-REFERENCE TO RELATED APPLICATIONS

This application claims the benefit of U.S. Provisional Application No. 61/842,563, filed Jul. 3, 2013.

BACKGROUND

The present disclosure is in the field of information technology, and more particularly relates to enterprise backup and disaster recovery.

Commonly assigned U.S. Pat. No. 8,346,726, which is incorporated herein by reference, discloses systems and methods for providing backups of computing systems, which provide for instant restoration of those systems as virtual machines. Additional methods for instantly available backups through virtual LUNs are disclosed in, for example, commonly assigned U.S. Pat. No. 7,937,547, also incorporated herein by reference. The hardware and software environment in which some of the embodiments of the disclosed subject matter operate is described in the '726 and '547 patents.

SUMMARY

The purpose and advantages of the disclosed subject matter will be set forth in and apparent from the description that follows, and will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of data backup and restoration. A backup of a source volume is created. The backup is divided into a plurality of chunks. Each chunk comprises a plurality of blocks. Each of the plurality of chunks is copied to a location in a cloud storage. An index is maintained indicating the location of each of the plurality of chunks in the cloud storage. A virtual volume is provided. The virtual volume includes a data cache and a cloud storage interface. The virtual volume is mounted on a computer system. The virtual volume receives a read request for a first block. A first location in cloud storage associated with a first chunk of the plurality of chunks is determined from the index such that the first chunk comprises the first block. The first chunk is copied from the first location in cloud storage to the data cache via the cloud storage interface. The read request is fulfilled from the data cache.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION

The following is a description of several preferred embodiments of various aspects of the disclosed subject matter, showing details of how systems may be constructed to carry out various aspects of the disclosure, and the steps that can be employed to utilize such systems and to practice such methods. These embodiments are illustrative only, and the disclosed subject matter is by no means limited to particular examples shown. The specific features of any particular embodiment should not be understood as limiting the scope of what is claimed.

In addition, it should be understood that the accompanying figures are presented for illustrative purposes only. The disclosed methodology and system are each sufficiently flexible and configurable such that they may be utilized in ways other than those depicted.

In various embodiments, program instructions are provided. Such program instructions may be recorded on non-transitory machine-readable media. Non-transitory machine-readable media include computer-readable media exclusive of transitory signals per se, such as radio waves or other freely propagating electromagnetic waves, electromagnetic waves propagating through a waveguide or other transmission media, or electrical signals transmitted through a wire. Examples of non-transitory machine-readable media include, without limitation, hard disks drives, solid-state drives, other optical and magnetic storage media known in the art, random access memory (RAM), read-only memory (ROM), erasable programmable read-only memory (EPROM), compact disc (CD), DVD, floppy disks, and punch cards.

Various operations described herein may be carried out by one or more computer processors. Suitable processors include those present in general purpose computers, special purpose computers, and ASICs (Application-specific integrated circuits). Operations executable by such processors include transmission and receipt of data via a network. In various embodiments, transmission and reception may be performed via a network interface. Suitable data networks include LANs (Local Area Networks), WANs (Wide Area Networks), and the Internet. In other embodiments, logic may be provided in the form of discrete logic or programmable logic arrays, which perform the specified operations through a combination of hardware elements.

Figure 1:
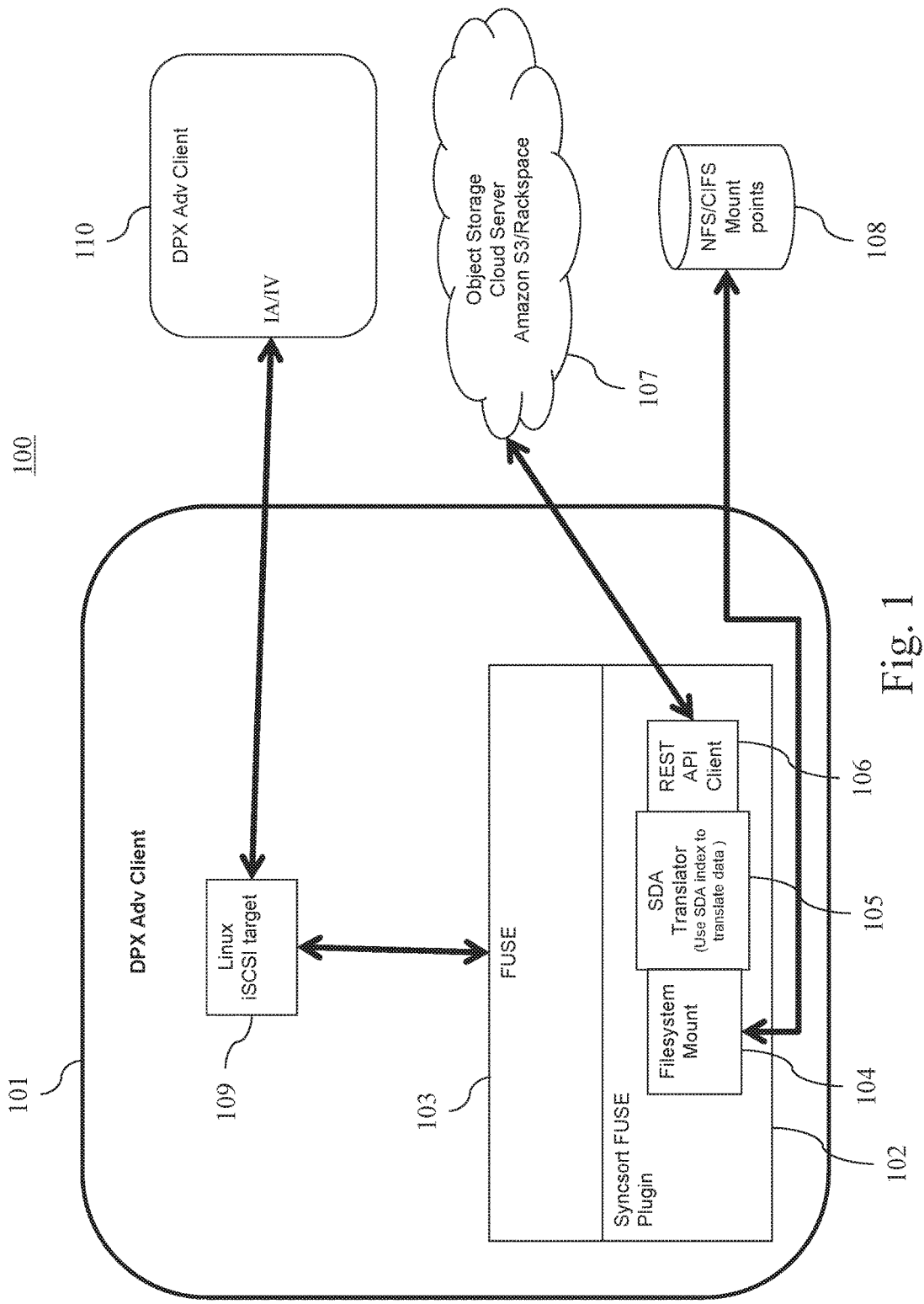
FIG. 1 is a schematic representation of a restoration system according to an embodiment of the present disclosure.

The methods and systems presented herein may be used to provide progressive restoration of a backup. The disclosed subject matter is particularly suited for progressive restoration from a remote storage system such as cloud storage in response to ongoing data requests. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

According to embodiments of the present disclosure, a storage client provides just in time restoration of data. The storage client may provide a virtual file system, for example, through a plugin to FUSE (Filesystem in Userspace). The virtual file system may be backed by one or more arbitrary storage media. In some embodiments, a FUSE plugin is backed by cloud storage such as buckets in Amazon® S3 (Simple Storage Service). Restoration of data is provided via a virtual logical disk, for example via an iSCSI logical unit. Rather than automatically proceeding to restore an entire volume or file, data is restored as needed to satisfy requests made during the course of usage in production environments.

Referring to FIG. 1, a system according to one embodiment of the present disclosure is provided. Client 101 (shown in FIG. 1 as a DPX Adv client) includes a FUSE plugin 102 (e.g., a Syncsort FUSE Plugin as shown in FIG. 1) to FUSE 103. FUSE plugin 102 includes a filesystem mount 104, a translator module 105 and an API client 106. API client 106 accesses cloud storage 107 via a network such as the Internet (not pictured). Filesystem mount 104 provides access to storage 108, which is in some embodiments an NFS (Network File System) or CIFS (Common Internet File System) volume. The translator module 105 is responsible for translating data requests for the API client 106 and the filesystem mount 104. In some embodiments, translator 105 maintains an index map (discussed further below). In some embodiments, the API client 106 is a REST API client and cloud storage 107 is Amazon® S3 or Rackspace®. However, other combinations of cloud storage providers and APIs may be used by API client 106.

Client 101 provides an iSCSI target 109 (shown in FIG. 1 as a Linux® iSCSI target) that is accessible via a network (not pictured) by client 110. To restore data previously backed up to cloud storage 107, individual data blocks are retrieved from cloud storage 107 as needed by the operating system or application.

In some embodiments, a data backup is created that is segmented or chunked into smaller parts. Chunking the backup data provides the ability to selectively restore data without the requirement to restore the entire backup at once. Chunking additionally allows the backup data to span multiple media. In some embodiments, multiple chunks are stored as multiple objects or files. In some embodiments, data chunks are replicated in parallel. During a backup process of a volume, an index map (Smart Data Access—SDA) is created that describes each block of the volume and the location of the data chunk where the data is stored. The index map is kept both on backup media with the data chunk and in a central database. The index map keeps track of replicas of each volume backup. The index map further includes location data for each data chunk. Using the location data, the recovery process may preferentially retrieve from the closest available location.

Figure 2:
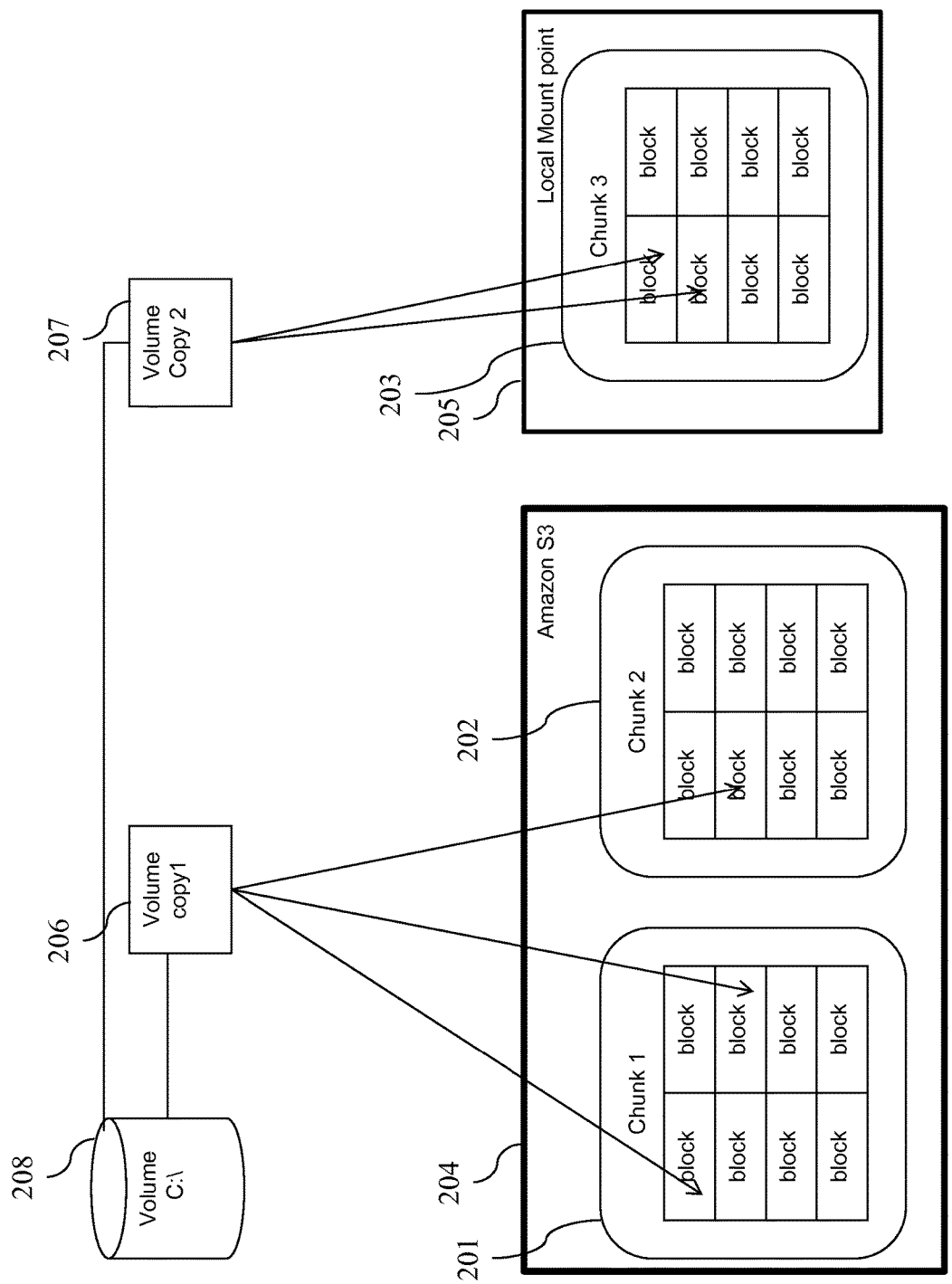
FIG. 2 is a schematic representation of chunking according to an embodiment of the present disclosure.

As shown in FIG. 2, chunks 201, 202, 203 may comprise a plurality of blocks and may reside in cloud storage 204 (e.g., Amazon S3) or at a local mount point 205. A volume copy 206, 207 of volume 208 may refer to blocks in one or more chunks.

In addition to allowing retrieval of data in the course of restoration, the index map allows global de-duplication among all backups. In particular, by including identifying information such as a hash value for each backed up chunk, any duplicate data blocks may share the same backup chunk. Additionally, full and incremental backups may be merged to provide restoration of a physical volume at a selected time.

Figure 3:
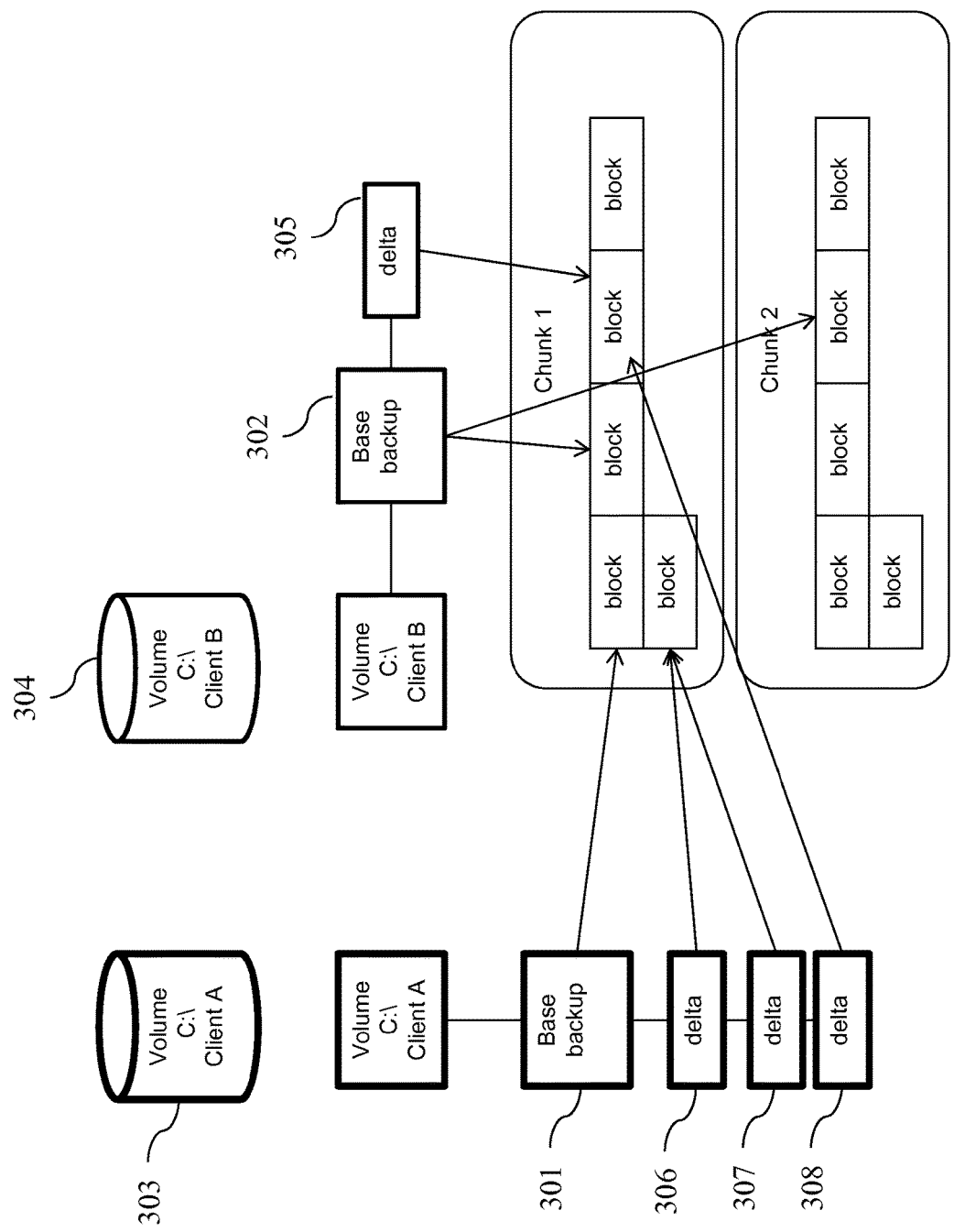
FIG. 3 is a schematic representation of de-duplication according to an embodiment of the present disclosure.

As depicted in FIG. 3, base backups 301, 302 may be made of volumes 303, 304. A plurality of subsequent delta backups 305, 306, 307, 308 may be made. Delta backups 306, 307, may refer to the same blocks in order to avoid duplication. Similarly, deltas 305, 308 of different volumes may also refer to the same blocks to avoid duplication.

An exemplary embodiment of the index map is described at Insets 1-5, below.

---
Inset 1
---
Volume
{
 client_node_id;
 volumeid;
 mountpoint;
 os_type;
 os_version;
 fs_type;
 Volume_Copy { }
 Volume_Copy { }
 . . .
}
---

---
Inset 2
---
Volume_Copy
{
 Base
 {
  Time { }
  Bitmap_Index { }
 }
 Delta
 {
  Time
  Bitmap_Index { }
 }
 Delta
 {
  Time
  Bitmap_Index { }
 }
 . . .
}
---

---
Inset 3
---
Bitmap_Index
{
 Block { }
 Block { }
 . . .
}
---

---
Inset 4
---
Block
{

-continued

Inset 4

```
Compression_Type { }
Length { }
Compressed_Length { }
Block_Offset
Is_Sparse { }
SHA256 Hash ( use for dedupe )
Chunk_ID
Chunk_Offset
}
```

Inset 5

```
Chunk
{
  chunk_id;
  storage_pool_id;
  location_id;
  objectstore
  {
     accesspoint: https://s3.amazon.us.com/:443
     bucket: mybackupslocation
     secret key: < >
     access key: < >
  }
  tapemedia
  {
    ...
  }
  Networkshare
  {
    ...
  }
  Localmountpoint
  {
    ...
  }
  Usbdrive
  {
    ...
  }
}
```

To recover a volume, a virtual disk is exposed that provides the same data as the original volume at the time backup was taken. The virtual disk does not perform a restore operation for a given block of data from backup media until that block of data is requested by an operating system or application accessing the virtual disk.

In some embodiments, an instant data recovery appliance houses an iSCSI (Internet Small Computer System Interface), SCSI (Small Computer System Interface), or FC (Fibre Channel) target and provides a virtual storage file. The virtual storage file does not use any storage space until data is requested by the operating system or applications. The chunks of data are read from backup media as they are requested by the iSCSI, SCSI, or FC target system. As data is read from media, chunks of data are cached in local storage. To increase performance given the overhead of reading from backup media, instead of retrieving only a block of data, the entire chunk of data that holds the data block is read and cached in local storage. Each chunk of data may hold multiple blocks of data. Since backup media may be high-latency storage such as tape or cloud object storage, overall performance is increased by reading a large chunk of data instead of a block of data at a time. For example, a given filesystem may have 2 kilobyte (kB) blocks, while chunks may be 50 megabytes (MB) or larger. If local cache storage is full, the least used chunks may be removed to make space for newly requested data chunk.

In cases where a bare metal recovery is required, such as where the original operating system on the physical machine has been destroyed, the machine may be booted into a recovery mode. The machine may be booted using a modular device such as a USB (Universal Serial Bus) drive, network boot, or CD/DVD (Compact Disc/Digital Versatile Disc/Digital Video Disc). In recovery mode, a boot partition is installed and an operating volume is restored by reading data from a network or USB drive. Once the operating system volume is recovered, the application volumes or any non-OS (Operating System) volumes are mounted via iSCSI, SCSI, or FC targets via the virtual disk as described above. If the operating system is capable of booting from iSCSI, FC, or SCSI target then virtual LUN (Logical Unit Number) recovery may be performed for the operating system volumes. If recovery of a virtual machine is required, both operating system and application volumes are provided as virtual LUNs.

The virtual LUN that is presented from backup media will allow the operating system and applications to write data to the virtual disk as if it were primary storage. Any new write data is cached locally on a recovery appliance. At set intervals, the new data is backed up to backup media. Data chunks that have been the subject of write operations are flagged, and are not removed from the local cache storage until it has they have been transferred to backup media.

Further advantages of the virtual LUN of the present disclosure are apparent where data storage and data retrieval are asymmetric in speed or cost. For example, where downstream bandwidth is lower than upstream bandwidth, the virtual LUN of the present disclosure allows immediate restoration without the delays involved in downloading an entire backup. Similarly, where downloads are subject to higher service charges than uploads, it is advantageous to download the minimum amount of data necessary. In these and similar cases, the present disclosure enables cost and resource efficient data restoration.

While the disclosed subject matter is described herein in terms of certain exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

While various embodiments have been described, it should be understood that they have been presented by way of example and not limitation. It will be apparent to persons skilled in the relevant art(s) that various changes in form and detail can be made therein without departing from the spirit and scope of the disclosed subject matter. Thus, the present embodiments should not be limited by any of the above-described embodiments. Accordingly, it is intended that the disclosed subject matter include modifications and variations that are within the scope of the claims appended to (and forming a part of) this disclosure, and their equivalents.

The invention claimed is:

1. A method for providing a mountable backup, comprising:
   creating a base backup of a source volume;
   dividing the base backup into a plurality of chunks, each chunk comprising a plurality of blocks;
   copying each of the plurality of chunks to a location in a cloud storage;
   maintaining in the cloud storage an index indicating the location of each of the plurality of chunks in the cloud storage, a copy of the index being stored with each of the plurality of chunks;
   creating a plurality of subsequent delta backups, the plurality of subsequent delta backups each referring to at least one of the plurality of chunks;
   providing a virtual volume comprising a data cache and a cloud storage interface, the virtual volume operative to provide restoration at a selected time by merging the base backup and the plurality of subsequent delta backups;
   mounting the virtual volume on a computer system;
   receiving at the virtual volume a read request for a first block;
   determining from the index a first location in the cloud storage associated with a first chunk of the plurality of chunks, the first chunk comprising the first block;
   copying the first chunk from the first location in the cloud storage to the data cache via the cloud storage interface;
   fulfilling the read request from the data cache;
   receiving at the virtual volume a write request for write data;
   caching the write data, into the first chunk in the data cache; and
   after a set interval, sending the first chunk containing the write data from the data cache to the cloud storage.

2. The method of claim 1, wherein at least one of the plurality of chunks is copied concurrently with at least another of the plurality of chunks.

3. The method of claim 1, further comprising:
   copying each of the plurality of chunks to an additional location in the cloud storage.

4. The method of claim 1, further comprising:
   selecting the location in the cloud storage based on its locality to the source volume.

5. The method of claim 4, wherein locality is measured by network latency.

6. The method of claim 4, wherein locality is measured by network bandwidth.

7. The method of claim 4, wherein locality is measured by physical proximity.

8. The method of claim 1, further comprising:
   removing duplicate chunks from the plurality of chunks.

9. The method of claim 1, further comprising:
   maintaining in a central database an additional copy of the index.

* * * * *